United States Patent
Yun et al.

(10) Patent No.: US 7,593,180 B2
(45) Date of Patent: Sep. 22, 2009

(54) HDD DATA READ CONTROL APPARATUS, MEDIUM, AND METHOD

(75) Inventors: Jong-yun Yun, Suwon-si (KR); Sang-hoon Chu, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 247 days.

(21) Appl. No.: 11/333,326

(22) Filed: Jan. 18, 2006

(65) Prior Publication Data
US 2006/0158770 A1   Jul. 20, 2006

(30) Foreign Application Priority Data
Jan. 19, 2005   (KR)   ................ 10-2005-0005067

(51) Int. Cl.
*G11B 5/596* (2006.01)
(52) U.S. Cl. ............... 360/78.04; 360/78.14; 360/77.04; 360/77.02
(58) Field of Classification Search ............ None
See application file for complete search history.

(56) References Cited

U.S. PATENT DOCUMENTS 6,188,538 B1   2/2001   Mills et al.
7,271,977 B1 *  9/2007   Melrose et al. .......... 360/77.04
2002/0067567 A1 *  6/2002   Szita .................. 360/77.04

FOREIGN PATENT DOCUMENTS

| JP | 05-234283 | 9/1993 |
| KR | 10-2004-0032382 | 4/2004 |
| KR | 1020040032382 A | 4/2004 |

OTHER PUBLICATIONS

Korean Patent Office Action Issued Jul. 20, 2006.

* cited by examiner

*Primary Examiner*—Andrew L Sniezek
(74) *Attorney, Agent, or Firm*—Staas & Halsey LLP

(57) ABSTRACT

A hard disc drive (HDD) data read control apparatus, medium, and method reading data from a disc having non-uniform track-to-track spacing. The data read control method of the HDD, in which data is read from a disc including non-uniform track-to-track spacing, includes seeking a target track by adopting an off track amount applied to a previously followed track, and reading the data while following the sought target track. Accordingly, production yield can be increased by making failure processing unnecessary even if a track-to-track spacing of a HDD is non-uniform.

22 Claims, 7 Drawing Sheets

HDD DATA READ CONTROL APPARATUS, MEDIUM, AND METHOD

CROSS-REFERENCE TO RELATED APPLICATIONS

This application claims the benefit of Korean Patent Application No. 10-2005-0005067, filed on Jan. 19, 2005, in the Korean Intellectual Property Office, the disclosure of which is incorporated herein in its entirety by reference.

BACKGROUND OF THE INVENTION

1. Field of the Invention

Embodiments of the present invention relate to a hard disc drive (HDD) data read control apparatus, medium, and method, and more particularly, to a HDD data read control apparatus, medium, and method for reading data from a disc having a non-uniform track-to-track spacing 2. Description of the Related Art A hard disc drive (HDD) may include a plurality of magnetic heads linked to rotating discs. Each head writes information by magnetizing a portion of a disc or reads information by detecting a magnetic field from a portion of the disc.

Each head is typically assembled with a flexure beam to form an assembly called a head gimbal assembly (HGA). The HGA may be assembled with an actuator arm having a voice coil assembled with a magnet assembly, with the voice coil and the magnet assembly forming a voice coil motor (VCM), which can move the head across a disc by activating the actuator arm.

Information may typically be stored on tracks concentrically formed on the disc. Here, the VCM may move the head from a certain track to another track in order to access data stored on the disc. Each track contains a plurality of sectors, each having a servo area and a data field.

A tracking servo of the HDD may control the head to move along a track centerline. The tracking servo may control the head to follow the track centerline by reading servo burst signals from the disc, computing a head location with respect to a track centerline, and controlling the VCM with reference to the computation result.

Servo information including the servo burst signals, as an example, may be written on the disc by a servo writer in a manufacturing process of the HDD.

Along with recent increases of high data capacities, the number of tracks per inch (TPI), which denotes the track density, has also been increasing. Accompanying the increase of track density, track-to-track spacing has necessarily been narrowed. Accordingly, the uniformity of the track-to-track spacing has been important. However, in a servo writing process of the HDD, a problem may occur in that the track-to-track spacing may be narrower or wider, i.e., non-uniform, at an arbitrary location, e.g., due to a plurality of reasons such as a mechanical errors, vibrations, resonance and/or write intensities.

This non-uniformity of the track-to-track spacing impedes correct tracking of the head by causing discontinuous information to be provided from the non-uniform location. For example, expandability of a write field may be impeded by a discordance between an expected head location, determined by an offtrack amount controlled by a servo or a magneto-resistive (MR) offset of the head, and an actual location of the head.

Here, in a case of an MR head, where the write and read heads are separated, the distance between the center of the write head and the center of the read head may vary according to head locations on the disc, so-called the MR offset. As a result, in order to make the read head of the MR head exactly follow tracks written by the write head, the location of the read head should be compensated to take into consideration an MT offset of a relevant track.

To this end, in a manufacturing process of the HDD, MR offsets may be measured along several locations on the disc and stored in a memory. Thereafter, the HDD can compensate for differing locations of the read head by referencing the stored MR offsets during read operations. If the head lays between sampling locations when a respective MR offset is predicted, the MR offset may be calculated by an interpolation scheme using MR offsets measured at adjacent sampling locations, for example. Further discussions of such MR offsets have been set forth in Korean Patent publication No. 2004-32382 (Apr. 17, 2004), Japanese Patent Publication No. 1993-234283 (Sep. 10, 1993) and U.S. Pat. Publication No. 6,188,538 (Feb. 13, 2001).

However, such interpolation schemes are based on the assumption that track widths are uniform. Accordingly, if the track widths are non-uniform, the interpolation MR offset compensation acc scheme cannot be normally performed.

If the track-to-track spacing is narrower than a normal spacing, a fatal result may occur where detected written data may be incorrectly detected due to the prominent occurrence of an adjacent track erasure effect, as a result of an incorrect tracking in an adjacent track. This adjacent track erase effect is increased by the accumulation of the same accompanied with frequent updates on the same track. As track densities further increase, this track-to-track spacing non-uniformity becomes a more inevitable problem.

Conventionally, to solve these problems generated due to the track-to-track spacing non-uniformity, such non-uniformities may be compensated by detecting and recording all locations on a disc where the track-to-track spacing is non-uniform or failure-processing the disc when the number of non-uniform track-to-track spacings exceeds a predetermined threshold.

However, in these conventional methods, according to the further increases in track density, the time required for such a track-to-track spacing non-uniformity test becomes greater and greater, and thus, the available yield of HDDs decreases.

SUMMARY OF THE INVENTION

Embodiments of the present invention provide a hard disc drive (HDD) data read control apparatus, medium, and method compensating for non-uniformity of a track-to-track spacing.

To achieve the above and/or other aspects and advantages, embodiments of the present invention include a data read control method of a hard disc drive (HDD) in which data is read from the HDD, including a portion of the HDD having track-to-track spacing non-uniformity, the method including seeking a target track by utilizing an offtrack amount applied to a previously followed track, and reading recorded data while following the sought target track.

The method may further include reading the recorded data from the target track with reference to an optimal position error signal (PES) value written in a servo area of the target track, changing the offtrack amount if an error is detected from the recorded data read from the target track and performing a retry read operation, and writing an optimal PES value, corresponding to the changed offtrack, in the servo area of the target track.

Here, the optimal PES is recorded adjacent to a burst signal in the servo area.

The method may further include reading the recorded data from the target track with reference to an optimal position error signal (PES) value recorded in a memory of the HDD, changing the offtrack amount if an error is detected from the recorded data read from the target track and performing a retry read operation, and writing an optimal PES value, corresponding to the changed offtrack, in the memory.

The memory may be accessible by a write/read channel circuit of the HDD for future seeking of a target track. In addition, the target track may be a sequential track after a previously followed track.

To achieve the above and/or other aspects and advantages, embodiments of the present invention include at least one medium including computer readable code to implement embodiments of the present invention.

To achieve the above and/or other aspects and advantages, embodiments of the present invention include a hard disc drive (HDD), including a disc to record data, a head to access the disc, a write/read circuit to record data on the disc using the head or reading data from the disc in response to a control of a controller, and the controller to control a seeking of a target track and a reading of data recorded on a target track of the disc in a data read mode, wherein the controller performs the seeking of the target track by utilizing an offtrack amount applied to a previously followed track and a reading of the recorded data of the target track while following the sought target track.

The controller may read the recorded data from the target track with reference to an optimal position error signal (PES) value recorded in a servo area of the target track, performs a read retry operation of the target track by changing the offtrack amount if an error is detected from the reading of recorded data read from the target track, and records an optimal PES value corresponding to the changed offtrack in the servo area.

In addition, the controller may record the optimal PES next to a burst signal in the servo area.

The controller may read the recorded data from the target track with reference to an optimal position error signal (PES) value recorded in a memory, perform a read retry operation of the target track by changing the offtrack amount if an error is detected from the reading of recorded data read from the target track, and record an optimal PES value corresponding to the changed offtrack in the memory.

Further, the memory may be separate from the disc.

The HDD may further include at least an additional disc and at least an additional head, wherein the controller performs a seeking of a target track for the additional disc by utilizing a corresponding offtrack amount applied to a corresponding previously followed track and a corresponding reading of the recorded data of the corresponding target track while following the corresponding target track To achieve the above and/or other aspects and advantages, embodiments of the present invention include a hard disc drive (HDD), including at least one disc, and a means to control a seeking of a target track of the at least one disc by utilizing an offtrack amount applied to a previously followed track and a reading of the recorded data of the target track while following the sought target track.

To achieve the above and/or other aspects and advantages, embodiments of the present invention include a recording and/or reproducing apparatus, including a medium to record data; and a controller to control a seeking of a target portion of the medium and a reading of data recorded on the target portion of the medium in a data read mode, wherein the controller performs the seeking of the target portion by utilizing an offtrack amount applied to a previously followed portion of the medium and a reading of the recorded data of the target portion while following the target portion.

The controller may read the recorded data from the target portion with reference to an optimal position error signal (PES) value recorded in a servo area of the target portion, performs a read retry operation of the target portion by changing the offtrack amount if an error is detected from the reading of recorded data read from the target portion, and records an optimal PES value corresponding to the changed offtrack in the servo area.

In addition, the controller may record the optimal PES next to a burst signal in the servo area.

Further, the controller may read the recorded data from the target portion with reference to an optimal position error signal (PES) value recorded in a memory, performs a read retry operation of the target portion by changing the offtrack amount if an error is detected from the reading of recorded data read from the target portion, and records an optimal PES value corresponding to the changed offtrack in the memory. Here, the memory may be separate from the medium.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
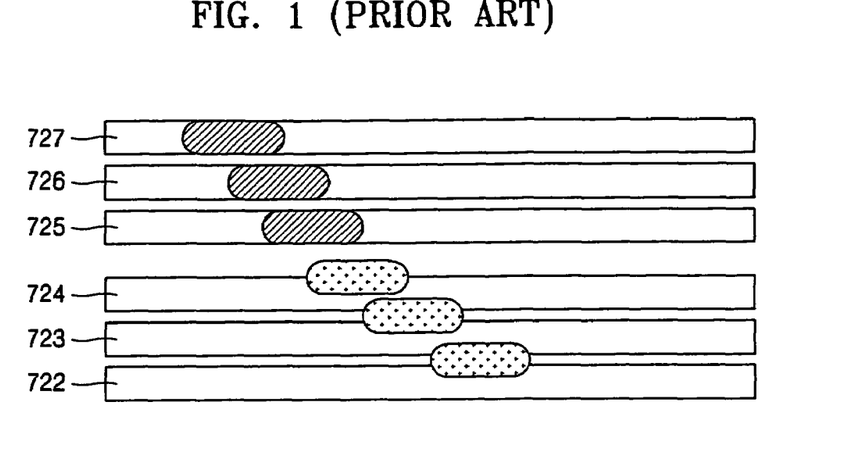
FIG. 1 illustrates non-uniformity of track-to-track spacing on a disc.

FIG. 1 illustrates non-uniformity of track-to-track spacing on a disc. Referring to FIG. 1, the spacing between track 725 and a track 724 is wider than other track-to-track spacings. That is, spacings between tracks 727 to 725 and spacings between tracks 724 and 722 may be uniform, while the spacing between the track 725 and the track 724 may be wider than the other track-to-track spacings.

Assuming that a magneto-resistive (MR) skew is +3 tracks, a read head would sequentially follow track 725, track 726, and track 727 to write data on track 722, track 723, and track 724, respectively. However, as shown in FIG. 1, since the spacing between track 725 and track 724 is wider than the other track-to-track spacings, track 722, track 723, and the track 724 (with these illustrated tracks being hatched with dot lines) are "offtracked." That is, as data is read out of the centers of the tracks, the offtrack amount in this case, i.e., the distance between a track center and the center of the written data, can be determined by the spacing between track 725 and track 724.

When data written on track 723 is read, a head follows track 723 based on servo information of track 723. However, as described above, since the data of track 723 has been offtracked, and recorded, the possibilities for read error occurrences increase.

Accordingly, it has been found that three main problems are generated due to the track-to-track spacing non-uniformity.

First, since the number of read retries for restoring the offtracked and recorded data increases, read performances decrease.

Second, if the track-to-track spacing is too narrow, the aforementioned adjacent track erasure (ATE) effect may occur.

Third, since the track-to-track spacing non-uniformity should be filtered out, and reduced, during the manufacturing process, additional time is required to implement the same, resulting in reduced yield.

Embodiments of the present invention provide a data read control method that enables accurate following of a target track under the track-to-track spacing non-uniformity.

Figure 2:
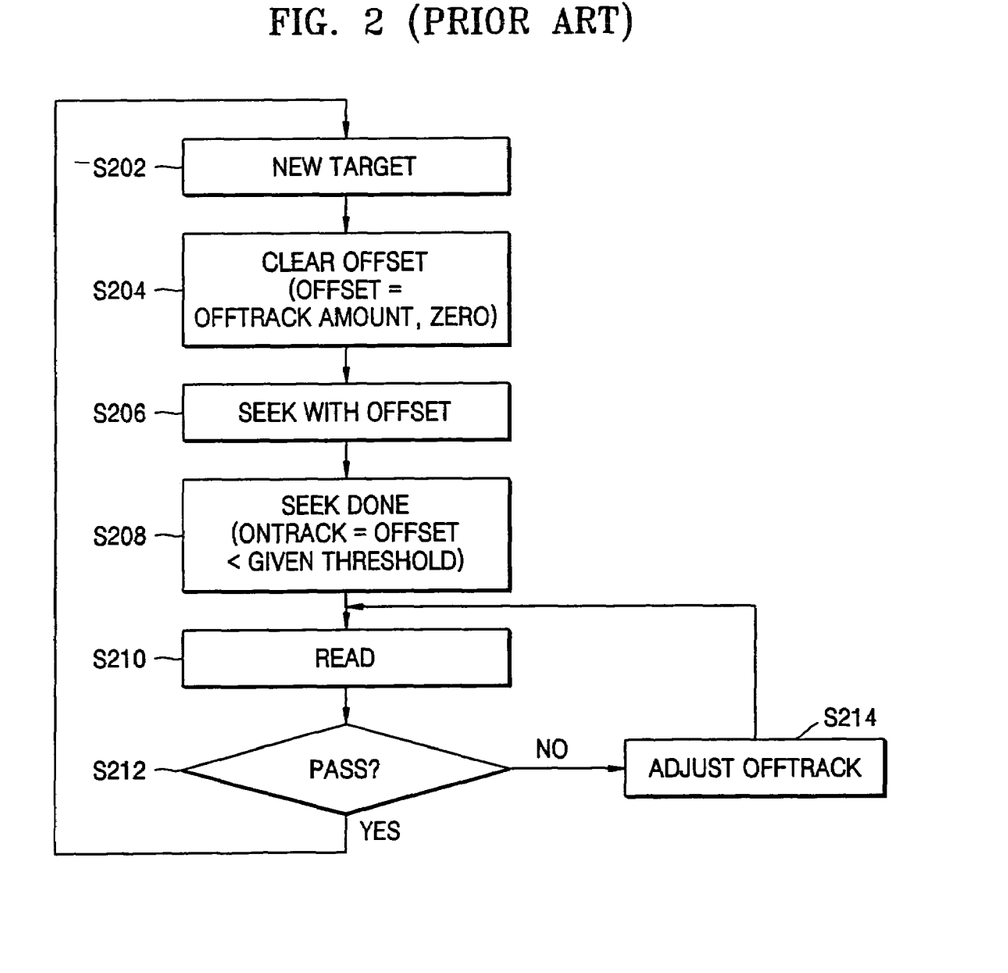
FIG. 2 illustrates a conventional data read method.

FIG. 2 illustrates a conventional data read method. In a conventional hard disc drive (HDD), an "ontrack read" method is used. That is, when a read command is received from a host computer, a target track is sought, and a read operation is performed after the "ontrack" to the target track is confirmed.

Referring to FIG. 2, when an appropriate target track is identified, in operation S202, an offset variable is cleared, in operation S204. That is, an "offset amount" is set to 0, for example.

The target track can be sought based solely on the anticipated offset variable, in operation S206.

Here, the seek operation may end in an "ontrack" state, in operation S208. Here, whether the ontrack state is achieved can be based on whether the magnitude of a position error signal (PES) on the target track is within a predetermined threshold, e.g., +/−10% range, for example.

The target track may then be read, in operation S210.

Whether a read error has occurred may then be determined, in operation S212, and if the read error occurred, an offtrack amount may be modified through a read retry operation, in operation S214, i.e., since a read error has been detected the expected offset may not match the actual offset. The target track may then be reread, in operation S210. As a result of the retry operation, the offset variable will be given the same value as the offtrack amount.

These procedures may similarly be repeated for new target tracks.

This conventional ontrack read method may be reasonable in most cases, but is unacceptable when there are track-to-track spacing non-uniformities. Referring back to FIG. 1, since track 722, track 723, and track 724 are offtracked and then conventionally recorded to, the retry operation must be performed for every track, according to the conventional method shown in FIG. 2, which actually results in decreased performance of the HDD.

When the track-to-track spacing is non-uniform, as shown in FIG. 1, rather than the aforementioned "ontrack read" method, an "offtrack read" method, i.e., a method of applying an offtrack amount from a previous track to a current track, may be more effective, according to embodiments of the present invention. This is because the track-to-track spacing uniformity may actually be maintained at locations other the non-uniform locations, i.e., the track-to-track spacing non-uniformity may be generated at unspecified locations on the disc. Thus, this offtrack read may be more effective in a case of a sequential read mode.

Referring back to FIG. 1, even if a retry operation is performed when track 722 is read, the retry operation may not be necessary when tracks 723 and 724 are read, i.e., the retry operation may be avoided by using the already known offtrack. amount from the retry operation of track 722.

Figure 3:
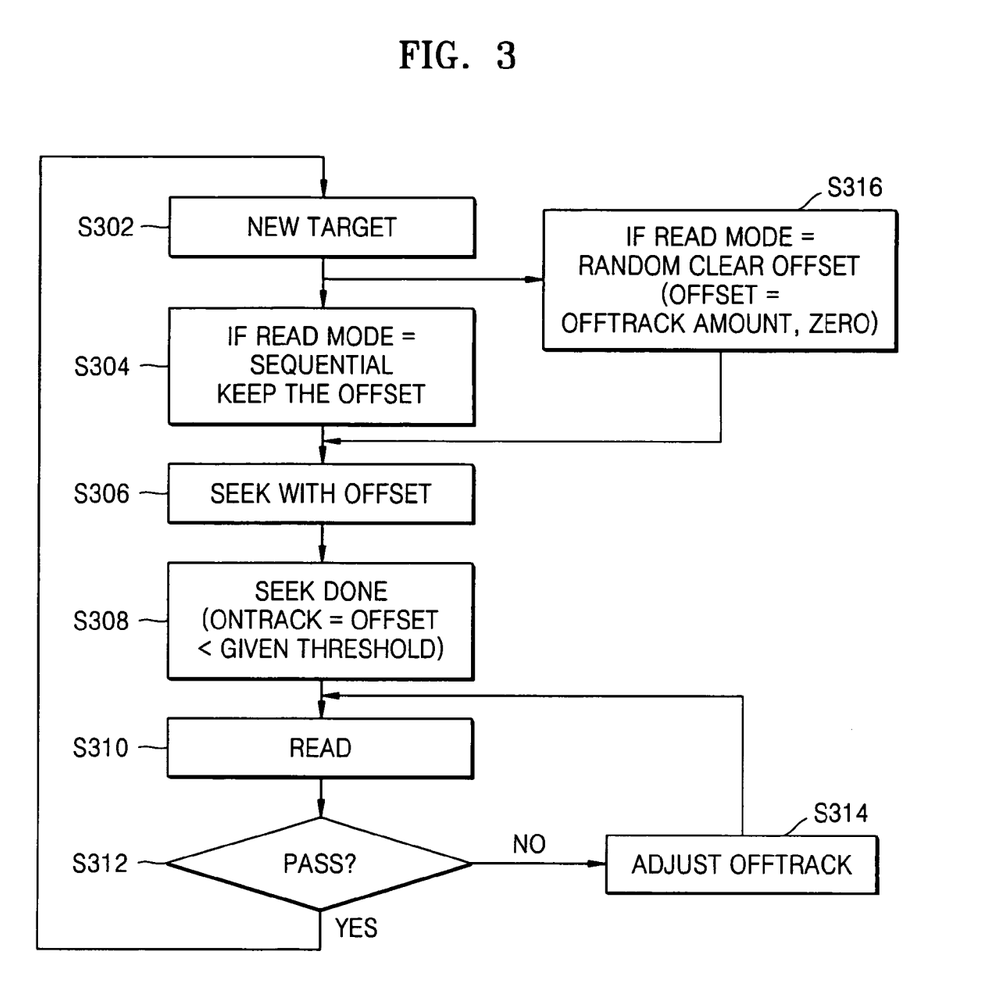
FIG. 3 illustrates a data read control method, according to an embodiment of the present invention.

FIG. 3 illustrates a data read control method, according to an embodiment of the present invention.

In the data read control method shown in FIG. 3, an offtrack amount used from a previous track may be used for a current track. For example, if a read operation was performed with a 30% offtrack amount in a previous track, the read operation in a current track may not be performed based solely on the anticipated ontrack status, e.g., by the conventional clearing of the 30% offtrack amount, as in the conventional method shown in FIG. 2, but rather, the read operation may be performed with the same offtrack amount, i.e., the 30% offtrack amount, as in the previous track.

In detail, when a target track is determined, in operation S302, if a read mode is set to be in a sequential mode, the offset variable used for a previous track may be maintained, in operation S316, and if the read mode is set to be in a random mode, the offset variable may be cleared, in operation S304.

The target track may be sought based on the offset variable, in operation S306.

The seek operation may then end in an ontrack state, in operation S308. Here, an ontrack status may be determined by whether the magnitude of a PES on the target track is within a predetermined threshold, e.g., +/−10% range.

Thereafter, the target track may be read, in operation S310.

It may then be determined whether a read error occurs, in operation S312. If the read error occurs, an offtrack amount may be modified by performing a retry operation, in operation S314, and the target track may be reread by proceeding to operation S310. As a result of the retry, the offset variable may be changed to be based on the offtrack amount.

These procedures can be repeated for new target tracks.

Figure 4A:
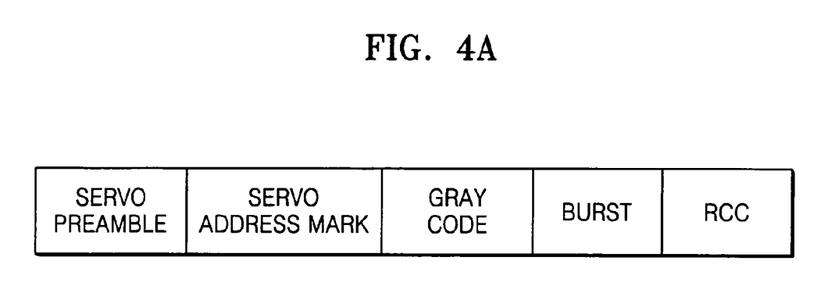
FIGS. 4A and 4B illustrate data read control methods, according to further embodiments of the present invention.
Figure 4B:
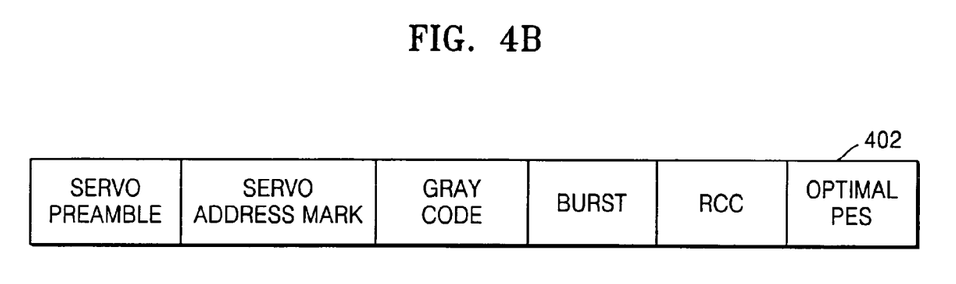

FIGS. 4A and 4B illustrate data read control methods, according to other embodiments of the present invention. In the embodiments shown in FIGS. 4A and 4B, a PES used to perform an optimal read may be recorded in servo information.

Referring to FIGS. 4A and 4B, in the servo information, according to embodiments of the present invention, besides conventional servo information, an optimal PES may be used to read a corresponding sector may also be recorded. The optimal PES may be recorded similarly to the recording of an RCC in FIG. 4A and may be next added to a burst signal.

An optimal PES 402, shown in FIG. 4, may be recorded in a retry operation. That is, if a retry operation, for recovering a read error, is successfully performed when the read error occurs, a PES used for the retry may be added to servo information and referred to in a future read operation. A writing of servo information, such as that shown in FIGS. 4A and 4B, in a servo area has been discussed in detail in Korean Patent Publication No. 2003-48371 (Jun. 19, 2003).

Figure 5:
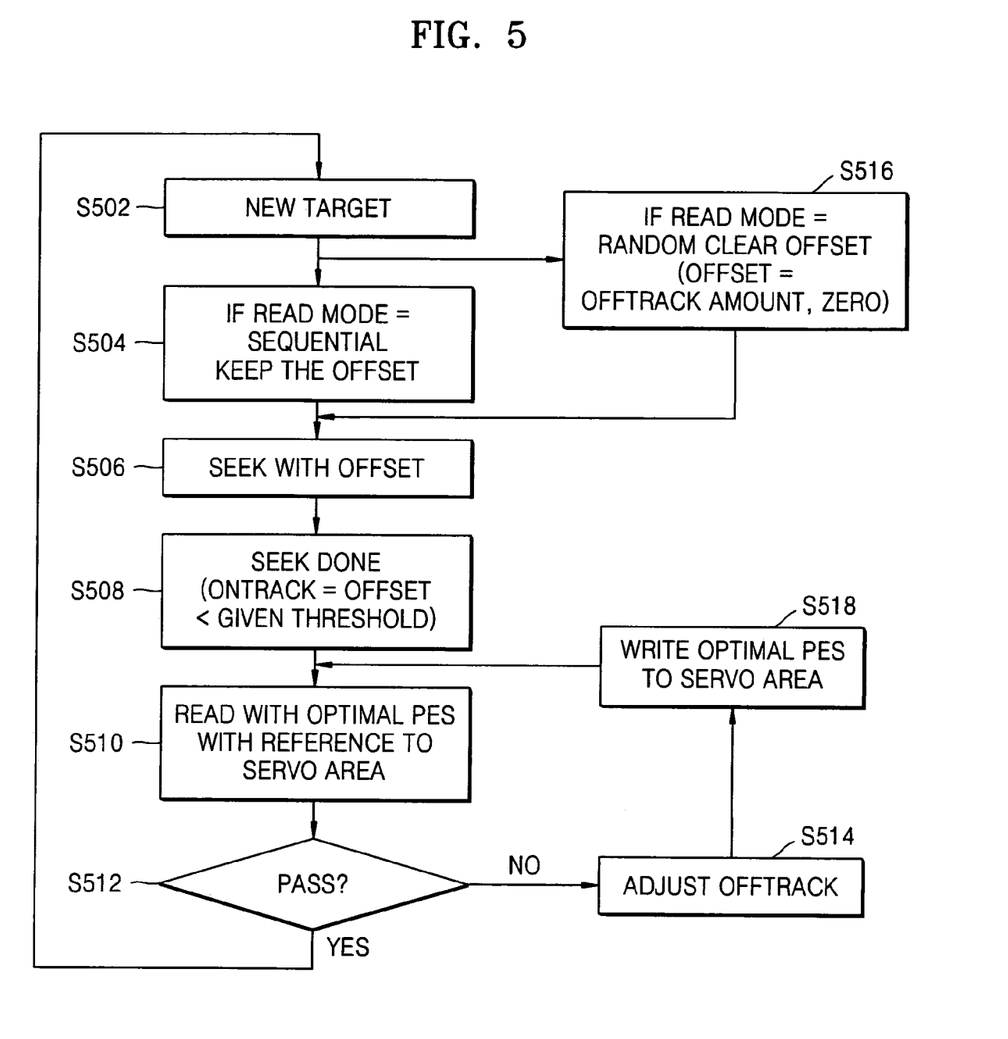
FIG. 5 illustrates a data read control method, according to another embodiment of the present invention.

FIG. 5 illustrates a data read control method, according to another embodiment of the present invention.

Upon a target track being determined, in operation S502, if a read mode is the sequential mode, an offset variable from a previous track may be maintained, in operation S516, and if the read mode is in a random mode, the offset variable may be cleared, in operation S504.

Thus, the target track may be sought based on the offset variable, in operation S506.

The seek operation may end in an ontrack state, in operation S508. Here, the ontrack status may be determined based on whether the magnitude of a PES on the target track is within a predetermined threshold, e.g., +/−10% range, for example.

The target track may then be read, in operation S510. Here, a servo unit (not shown) may read an optimal PES included in servo information of a disc, i.e., the optimal PES recorded in operation S518, and adjust the offset variable.

It may be determined whether a read error occurs, in operation S512, and if the read error occurs, an offtrack amount may be modified by performing a retry operation, in operation S514, and a PES corresponding to the modified offtrack amount may be recorded in a servo area, in operation S518, and the target track may be reread by proceeding to operation S510. As the retry results, the offset variable can be made to be based on the value of the offtrack amount.

These procedures may be repeated for new target tracks.

Figure 6:
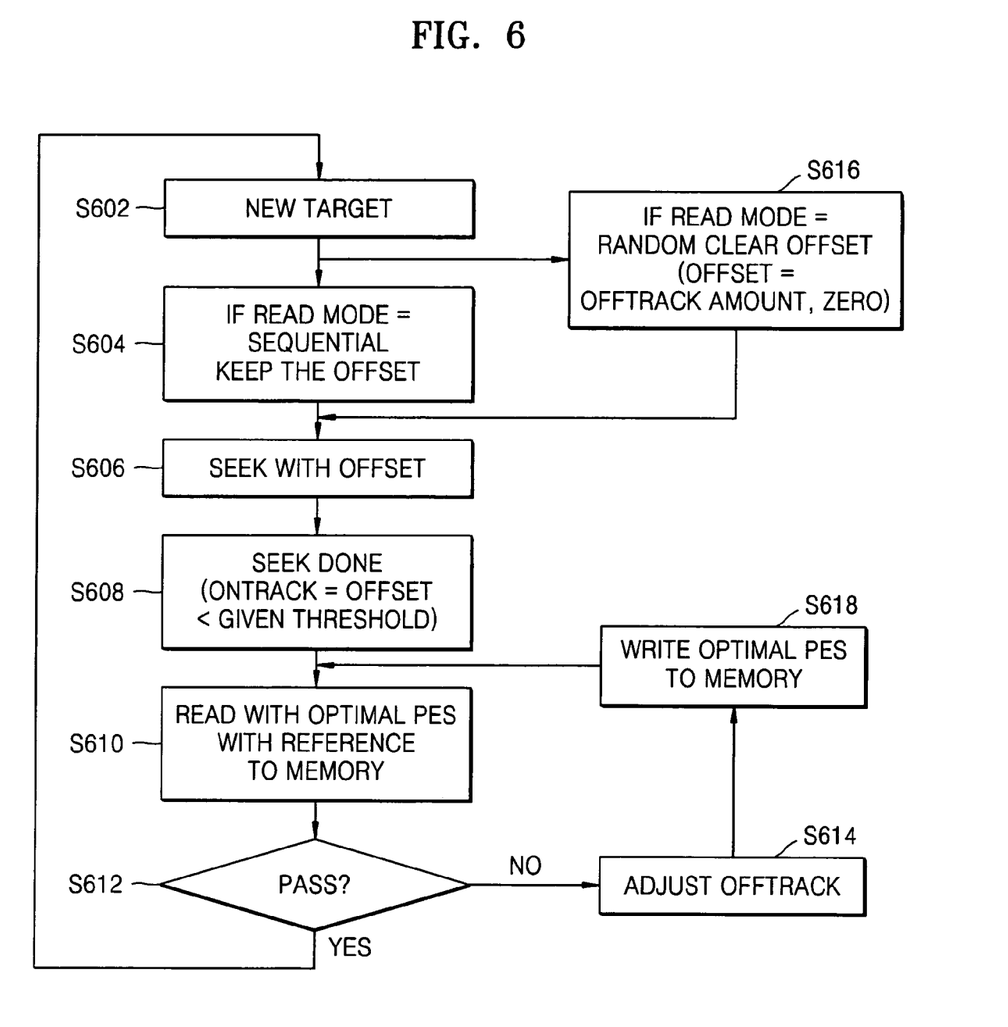
FIG. 6 illustrates a data read control method, according to still another embodiment of the present invention.

FIG. 6 illustrates a data read control method, according to another embodiment of the present invention.

Unlike the method shown in FIG. 5, where the optimal PES is recorded in the servo area, here in the embodiment of FIG. 6, an optimal PES may be recorded in a memory, e.g., separate from the disc. Here, it may be preferable for the optimal PES to be recorded in a memory included in a write/read channel circuit.

When a target track is determined in operation S602, if a read mode is the sequential mode, an offset variable used for a previous track may be maintained, in operation S616, and if the read mode is the random mode, the offset variable may be cleared, in operation S604.

The target track may then be sought based on the offset variable, in operation S606.

The seek operation may end in an ontrack state, in operation S608. Here, whether the read operation is in the ontrack state may be determined based on whether the magnitude of a PES on the target track is within a predetermined threshold, e.g., +/−10% range, for example.

The target track may then be read, in operation S610. Here, a servo unit (not shown) may read an optimal PES included in servo information of a disc, i.e., the optimal PES recorded in operation S618, for example, and may adjust the offset variable.

If it is determined that a read error occurs, in operation S612, an offtrack amount may be modified by performing a retry operation, in operation S614, a PES corresponding to the modified offtrack amount may then be recorded in memory, in operation S618, and the target track may be reread by proceeding to operation S610. As results of the retry operation, the offset variable may be made to be based on the value of the offtrack amount.

These procedures may be repeated for new target tracks.

Figure 7:
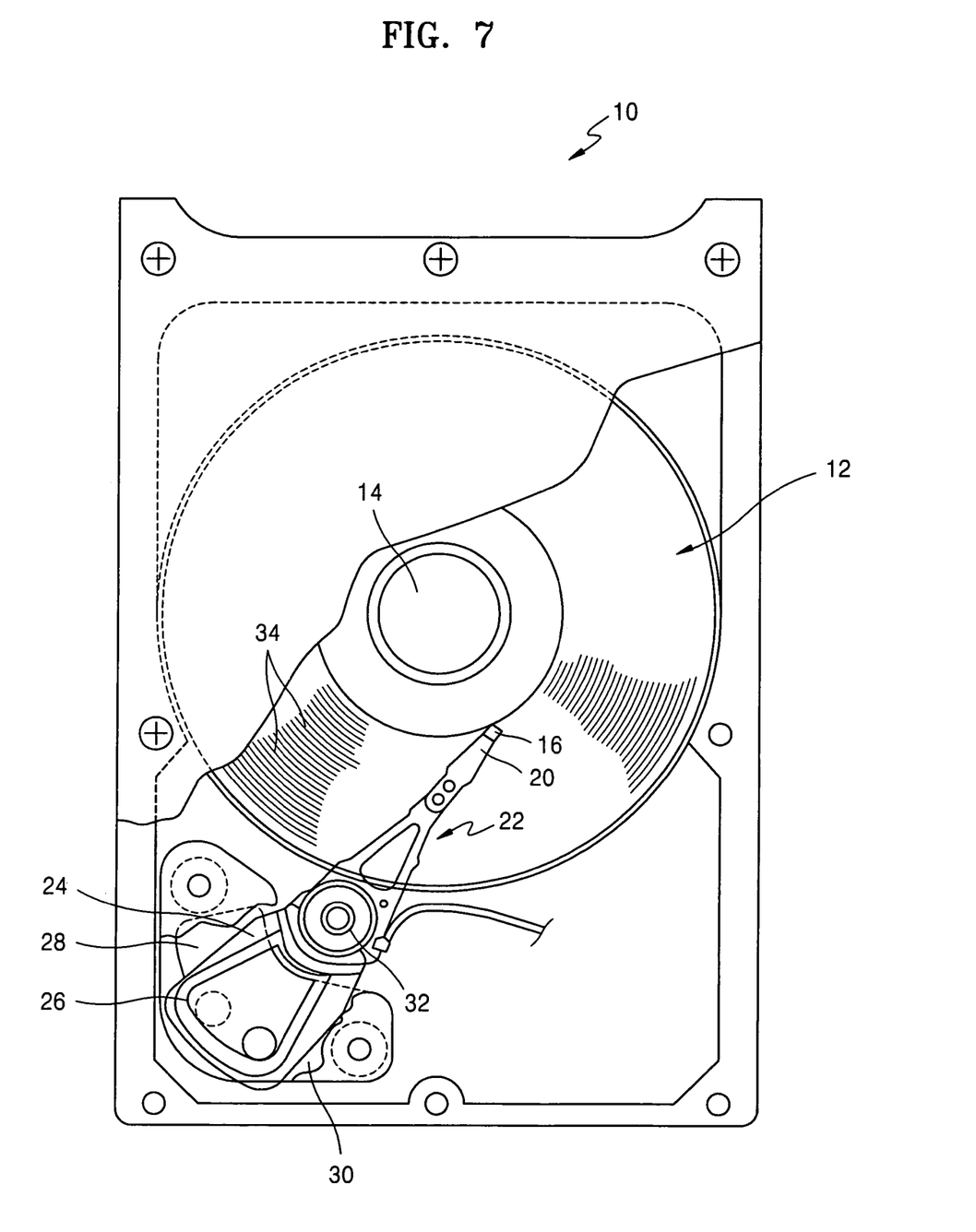
FIG. 7 illustrates a HDD and a corresponding head disc assembly (HDA), according to an embodiment of the present invention.

FIG. 7 illustrates a HDD with a head disc assembly (HDA) 10, according to an embodiment of the present invention.

Referring to FIG. 7, the HDA 10 may include at least one disc 12 to be rotated by a spindle motor 14. The HDA 10 may also include a transducer (not shown) adjacently located on a disc surface, e.g., the aforementioned head.

The transducer can read and/or write information from/to the rotating disc 12 by sensing magnetic fields formed on the disc 12 or by magnetizing the same. Typically, a transducer may be applied to each disc surface. The transducer may include a write transducer which magnetizes a portion of the disc 12 and a read transducer which senses a magnetic field of a portion of disc 12. The read transducer may include an MR component.

The transducer can be combined with a header 16. The header 16 may generate an air bearing between the transducer and the disc surface, and may be combined with a head stack assembly (HSA) 22. The HSA 22 may be attached to an actuator arm 24 having a voice coil 26, with the voice coil 26 being located adjacent to a magnetic assembly 28 making up (supporting) a voice coil motor (VCM) 30. A current supplied to the voice coil 26 can generate a torque to rotate the actuator arm 24 around a bearing assembly 32. The rotation of the actuator arm 24 thereby moves the transducer across the disc surface.

Information may be recorded in concentric tracks of the disc 12, and in general, each track 34 may include a plurality of sectors. Each sector may further include a servo area and a data field.

Figure 8:
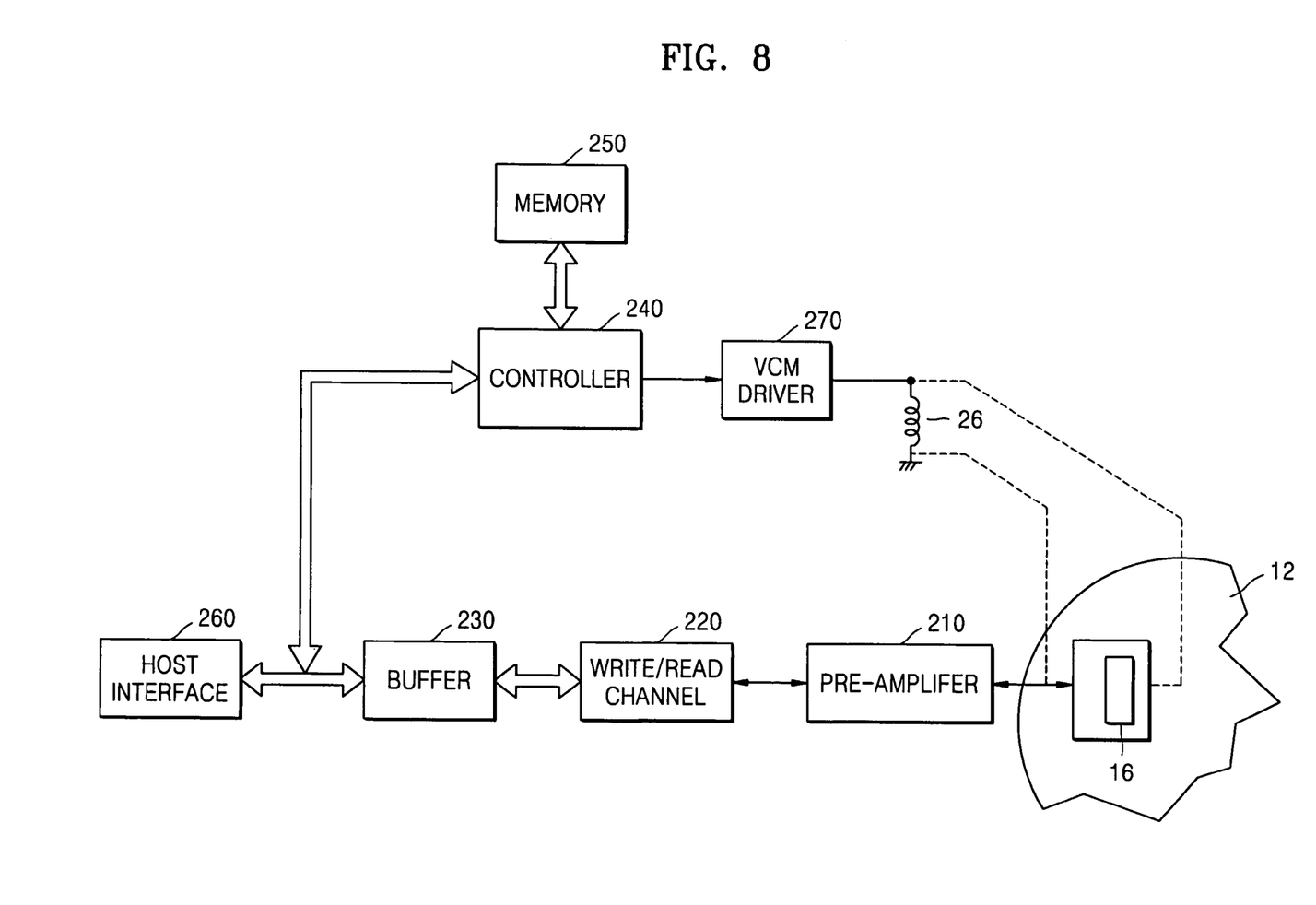
FIG. 8 illustrates an electrical circuit configuration of a HDD, according to an embodiment of the present invention.

FIG. 8 illustrates an electrical circuit configuration of a HDD, according to an embodiment of the present invention.

Referring to FIG. 8, the HDD may include the disc 12, the transducer 16, a pre-amplifier 210, a write/read channel 220, a buffer 230, a controller 240, a memory 250, a host interface 260, and a VCM driver 270.

A circuit including the pre-amplifier 210 and the write/read channel 220 can be called a write/read circuit.

Firmware may be stored in the memory 250 for controlling the HDD, specification information of servo address/index signal of a reference servo pattern, and specification information of servo address/index signal of a final servo pattern. Here, the memory 250 may be designed with a flash memory, which is a non-volatile memory, for example.

In a data read mode, the HDD may amplify an electrical signal sensed by the transducer 16 (e.g., the head) using the pre-amplifier 210 for convenience of signal processing. The HDD may encode the amplified analog signal into a digital signal that can be read by a host device (not shown) using the write/read channel 220, convert the digital signal to stream data, temporarily store the stream data in the buffer 230, and transmit the stream data to the host device via the host interface 260.

In a data write mode, the HDD may receive data from the host device via the host interface 260, temporarily store the received data in the buffer 230, sequentially output the data stored in the buffer 230, convert the sequentially output data to a binary data stream suitable for a write channel using the write/read channel 220, and record a write current amplified by the pre-amplifier 210 on the disc 12 using the transducer 16.

The controller 240 may analyze a command received from the host device through the host interface 260 and perform a control corresponding to the analyzed results, and if a data read command is received from the host device, the controller 240 may read data while following a target track.

As noted above, it may be preferable that the tracks on the disc 12 have uniform track-to-track spacings. However, track-to-track uniformity may not always be achieved, and in actuality may be very difficult. That is, a servo writer (not shown) writing servo information should perform a highly accurate position control, and disturbances should not exist when the servo information is written. However, due to costs and manufacturing environments, it may be difficult to satisfy these conditions.

In the apparatus shown in FIG. 8, the controller 240 may read data while following a target track of the disc 12, according to embodiments of the present invention. In detail, the controller 240 may perform a process of seeking the target track, adopting an offtrack amount applied to a previously followed track, and a process of reading the data.

For example, if a read operation is performed in a previous track with a +30% offtrack amount, the target track may be sought by applying the same offtrack amount, i.e., the +30% offtrack amount, and data may then be read.

If an error occurs from the data read from the target track, the controller 240 may then perform a retry operation by changing the offtrack amount and then recording an optimal PES corresponding to the changed offtrack in a servo area of the disc 12 or a memory (not shown) included in the write/read channel 220. The optimal PES recorded in the servo area or the memory may then be referred to in subsequent read operations.

Embodiments of the present invention may be realized at least as an apparatus, method, and/or a system. When embodiments of the present invention are realized as computer readable code of a medium, e.g., a computer readable medium, embodiments of the present invention may be embodied as code segments for executing required operations. Code, a program, or code segments can be stored/transferred in the medium, e.g., a processor readable recording medium, for example. The medium may be any data storage device that can store code which can be thereafter be implemented by a computer system, for example. Examples of the media include electronic circuits, semiconductor memory devices, read-only memory (ROM), flash memory, erasable ROM, floppy disks, optical discs, hard discs, optical fiber media, and RF networks.

As described above, in a data read control, apparatus, medium, and method, according to embodiments of the present invention, by using an offtrack amount used in a previous track, in a subsequent track, it becomes possible to prevent the decreasing of performance of a HDD due to track-to-track spacing non-uniformities. Accordingly, since failure processing is unnecessary even if a track-to-track spacing of a HDD is non-uniform, overall yield increases.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A data read control method of a hard disc drive (HDD) in which data is read from the HDD, including a portion of the HDD having track-to-track spacing non-uniformity, the method comprising:
    seeking a target track by utilizing a same offtrack amount determined to be appropriate during a following of a previously followed adjacent track, the offtrack amount corresponding to a relationship between the previously followed adjacent track and relative positioning of written data for the previously followed adjacent track; and
    reading recorded data while following the sought target track.

2. The method of claim 1, wherein the target track is a sequential track after the previously followed adjacent track.

3. At least one computer readable medium having stored thereon computer readable code to implement the method of claim 1.

4. A data read control method of a hard disc drive (HDD) in which data is read from the HDD, including a portion of the HDD having track-to-track spacing non-uniformity, the method comprising:
    seeking a target track by utilizing an offtrack amount for a previously followed track, the offtrack amount corresponding to a relationship between the previously followed track and relative positioning of written data for the previously followed track;
    reading recorded data while following the sought target track;
    reading the recorded data from the target track with reference to an optimal position error signal (PES) value written in a servo area of the target track;
    changing the offtrack amount if an error is detected from the recorded data read from the target track and performing a retry read operation; and
    writing an optimal PES value, corresponding to the changed offtrack, in the servo area of the target track.

5. The method of claim 4, wherein the optimal PES is recorded adjacent to a burst signal in the servo area.

6. A data read control method of a hard disc drive (HDD) in which data is read from the HDD, including a portion of the HDD having track-to-track spacing non-uniformity, the method comprising:
    seeking a target track by utilizing an offtrack amount for a previously followed track, the offtrack amount corresponding to a relationship between the previously followed track and relative positioning of written data for the previously followed track;
    reading recorded data while following the sought target track;
    reading the recorded data from the target track with reference to an optimal position error signal (PES) value recorded in a memory of the HDD;
    changing the offtrack amount if an error is detected from the recorded data read from the target track and performing a retry read operation; and
    writing an optimal PES value, corresponding to the changed offtrack, in the memory.

7. The method of claim 6, wherein the memory is accessible by a write/read channel circuit of the HDD for future seeking of a target track.

8. A hard disc drive (HDD), comprising:
    a disc to record data;
    a head to access the disc;
    a write/read circuit to record data on the disc using the head or reading data from the disc in response to a control of a controller; and
    the controller to control a seeking of a target track and a reading of data recorded on a target track of the disc in a data read mode,
    wherein the controller performs the seeking of the target track by utilizing a same offtrack amount determined to be appropriate during a following of a previously followed adjacent track and a reading of the recorded data of the target track while following the sought target track, the offtrack amount corresponding to a relationship between the previously followed adjacent track and relative positioning of written data for the previously followed adjacent track.

9. The HDD of claim 8, further comprising at least an additional disc and at least an additional head, wherein the controller performs a seeking of a target track for the additional disc by utilizing a corresponding offtrack amount applied to a corresponding previously followed track and a corresponding reading of the recorded data of the corresponding target track while following the corresponding target track.

10. A hard disc drive (HDD), comprising:
a disc to record data;
a head to access the disc;
a write/read circuit to record data on the disc using the head or reading data from the disc in response to a control of a controller; and
the controller to control a seeking of a target track and a reading of data recorded on a target track of the disc in a data read mode,
wherein the controller performs the seeking of the target track by utilizing an off track amount for a previously followed track and a reading of the recorded data of the target track while following the sought target track, the offtrack amount corresponding to a relationship between the previously followed track and relative positioning of written data for the previously followed track,
wherein the controller reads the recorded data from the target track with reference to an optimal position error signal (PES) value recorded in a servo area of the target track, performs a read retry operation of the target track by changing the offtrack amount if an error is detected from the reading of recorded data read from the target track, and records an optimal PES value corresponding to the changed offtrack in the servo area.

11. The HDD of claim 10, wherein the controller records the optimal PES next to a burst signal in the servo area.

12. A hard disc drive (HDD), comprising:
a disc to record data;
a head to access the disc;
a write/read circuit to record data on the disc using the head or reading data from the disc in response to a control of a controller; and
the controller to control a seeking of a target track and a reading of data recorded on a target track of the disc in a data read mode,
wherein the controller performs the seeking of the target track by utilizing an offtrack amount for a previously followed track and a reading of the recorded data of the target track while following the sought target track, the offtrack amount corresponding to a relationship between the previously followed track and relative positioning of written data for the previously followed track,
wherein the controller reads the recorded data from the target track with reference to an optimal position error signal (PES) value recorded in a memory, performs a read retry operation of the target track by changing the offtrack amount if an error is detected from the reading of recorded data read from the target track, and records an optimal PES value corresponding to the changed offtrack in the memory.

13. The HDD of claim 12, wherein the memory is separate from the disc.

14. A hard disc drive (HDD), comprising:
at least one disc; and
a means to control a seeking of a target track of the at least one disc by utilizing a same offtrack amount determined to be appropriate during a following of previously followed adjacent track and a reading of the recorded data of the target track while following the sought target track, the offtrack amount corresponding to a relationship between the previously followed adjacent track and relative positioning of written data for the previously followed adjacent track.

15. A recording and/or reproducing apparatus, comprising:
a medium to record data; and
a controller to control a seeking of a target portion of the medium and a reading of data recorded on the target portion of the medium in a data read mode,
wherein the controller performs the seeking of the target portion by utilizing an offtrack amount determined to be appropriate during a following of a sequentially previously followed portion of the medium and a reading of the recorded data of the target portion while following the target portion, the offtrack amount corresponding to a relationship between the previously followed track and relative positioning of written data for the previously followed track.

16. A recording and/or reproducing apparatus, comprising:
a medium to record data; and
a controller to control a seeking of a target portion of the medium and a reading of data recorded on the target portion of the medium in a data read mode,
wherein the controller performs the seeking of the target portion by utilizing an offtrack amount for a previously followed portion of the medium and a reading of the recorded data of the target portion while following the target portion, the offtrack amount corresponding to a relationship between the previously followed track and relative positioning of written data for the previously followed track,
wherein the controller reads the recorded data from the target portion with reference to an optimal position error signal (PES) value recorded in a servo area of the target portion, performs a read retry operation of the target portion by changing the offtrack amount if an error is detected from the reading of recorded data read from the target portion, and records an optimal PES value corresponding to the changed offtrack in the servo area.

17. The recording and/or reproducing apparatus of claim 16, wherein the controller records the optimal PES next to a burst signal in the servo area.

18. A recording and/or reproducing apparatus, comprising:
a medium to record data; and
a controller to control a seeking of a target portion of the medium and a reading of data recorded on the target portion of the medium in a data read mode,
wherein the controller performs the seeking of the target portion by utilizing an offtrack amount for a previously followed portion of the medium and a reading of the recorded data of the target portion while following the target portion, the offtrack amount corresponding to a relationship between the previously followed track and relative positioning of written data for the previously followed track,
wherein the controller reads the recorded data from the target portion with reference to an optimal position error signal (PES) value recorded in a memory, performs a read retry operation of the target portion by changing the offtrack amount if an error is detected from the reading of recorded data read from the target portion, and records an optimal PES value corresponding to the changed offtrack in the memory.

19. The recording and/or reproducing apparatus of claim 18, wherein the memory is separate from the medium.

20. A data read control method of a hard disc drive (HDD) in which data is read from the HDD, including a portion of the HDD having track-to-track spacing non-uniformity, the method comprising:

seeking a target track by utilizing an offtrack amount for a previously followed track, the offtrack amount corresponding to a relationship between the previously followed track and relative positioning of written data for the previously followed track;

reading recorded data while following the sought target track; and changing an optimal PES value, corresponding to the offtrack amount for the previously followed track, in the servo area of the target track.

21. A hard disc drive (HDD), comprising:
a disc to record data;
a head to access the disc;
a write/read circuit to record data on the disc using the head or reading data from the disc in response to a control of a controller; and
the controller to control a seeking of a target track and a reading of data recorded on a target track of the disc in a data read mode,
wherein the controller controls the seeking of the target track by utilizing an offtrack amount for a previously followed track, reading of the recorded data of the target track while following the sought target track, the offtrack amount corresponding to a relationship between the previously followed track and relative positioning of written data for the previously followed track, and changing of an optimal PES value, corresponding to the offtrack amount for the previously followed track, in the servo area of the target track.

22. A recording and/or reproducing apparatus, comprising:
a medium to record data; and
a controller to control a seeking of a target portion of the medium and a reading of data recorded on the target portion of the medium in a data read mode,
wherein the controller controls the seeking of the target portion by utilizing an offtrack amount for a previously followed portion of the medium, reading of the recorded data of the target portion while following the target portion, the offtrack amount corresponding to a relationship between the previously followed track and relative positioning of written data for the previously followed track, and changing of an optimal PES value, corresponding to the offtrack amount for the previously followed track, in the servo area of the target track.

* * * * *

UNITED STATES PATENT AND TRADEMARK OFFICE
CERTIFICATE OF CORRECTION

| | | |
|---|---|---|
| PATENT NO. | : 7,593,180 B2 | Page 1 of 1 |
| APPLICATION NO. | : 11/333326 | |
| DATED | : September 22, 2009 | |
| INVENTOR(S) | : Jong-yun Yun et al. | |

It is certified that error appears in the above-identified patent and that said Letters Patent is hereby corrected as shown below:

Title Page, Item (57) (Abstract), Line 6, change "off track" to --offtrack--.

Column 11, Line 16, change "off track" to --offtrack--.

Signed and Sealed this

Ninth Day of February, 2010

David J. Kappos
*Director of the United States Patent and Trademark Office*